June 17, 1930.  E. G. DOLAND  1,765,135
COVER HOLDER
Filed April 30, 1929
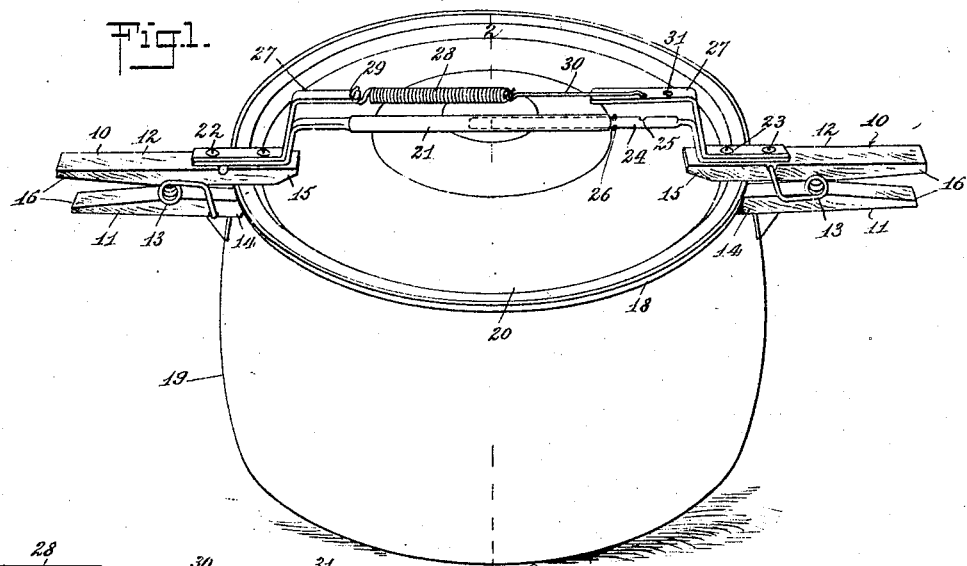
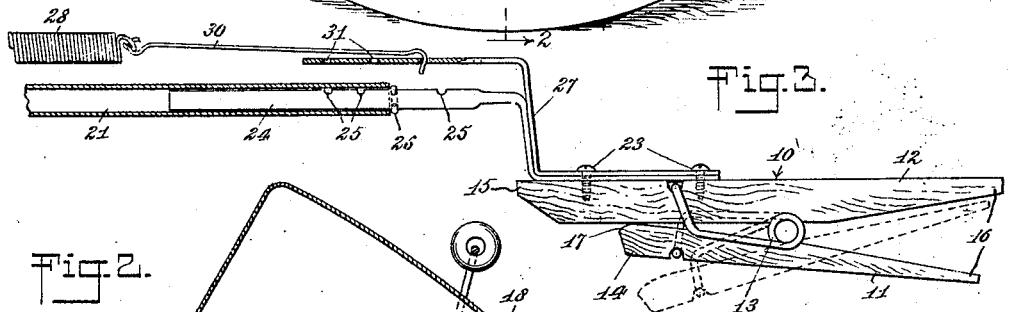
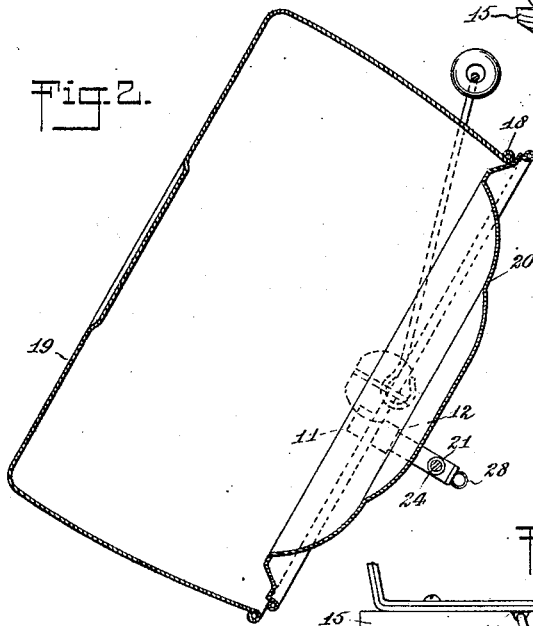
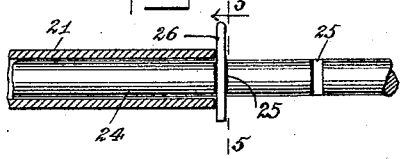
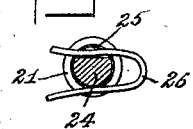
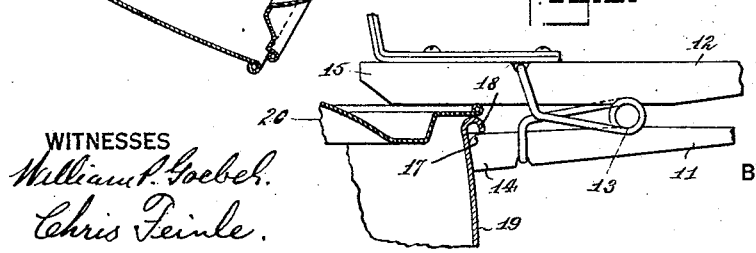
WITNESSES
INVENTOR
Eben G. Doland
BY
ATTORNEY Patented June 17, 1930

1,765,135

UNITED STATES PATENT OFFICE

EBEN G. DOLAND, OF STARKSBORO, VERMONT

COVER HOLDER

Application filed April 30, 1929. Serial No. 359,378.

This invention relates to a holder or retaining device useful for the purpose of holding or retaining a cover or lid of a cooking vessel, kettle or like receptacles, in applied position, and for preventing unintentional displacement thereof, while canting the vessel for the purpose of drawing the liquid therefrom.

The principal object of the invention is the provision of a device of the indicated character which may be readily employed for the intended purpose, one which may be readily detached, and one which may be readily adjusted to be serviceable in conjunction with cooking vessels and their covers or lids of various sizes or diameters.

The nature of the invention and its distinguishing features and advantages will appear when the following specification is read in connection with the accompanying drawing, in which—

Figure 1 is a perspective view of a cooking vessel and showing the cover thereof held in place with a device constructed in accordance with the invention.

Fig. 2 is a sectional view taken as indicated by the line 2—2, of Fig. 1, but showing the vessel canted, the cover being drawn slightly from its normal position, for the purpose of draining the liquid from the vessel.

Fig. 3, is an illustration, partly in elevation and partly in section of substantially one-half of the device.

Fig. 4, is a detail view.

Fig. 5, is a section taken on the line 5—5, of Fig. 4.

Fig. 6, illustrates one of the spring clamps in clamping engagement with the rim and cover of the vessel.

Referring now more particularly to the drawing, it will be apparent that the holder includes a pair of spring clamps 10 which are of similar construction. Each clamp 10 consists of lower and upper clamp members 11 and 12, normally spring pressed together by a spring 13, so as to press the clamp end 14 of the lower member 11 against the clamping end 15 of the upper member 12. The upper member 12 is somewhat longer than the lower member 11 so that the end 15 thereof will project beyond the end 14. The manipulatable ends 16 of the clamping members are so formed as to provide enough space between them, to permit movement thereof toward each other, to cause the ends 14 and 15 to move away from each other, it being apparent that the coil of the spring 13 serves as a fulcrum for this purpose. The end 14 of the clamping member 11 is slightly beveled or rounded as at 17, so that it will be better adapted to grip under the rim 18 of a cooking vessel 19. Due to the fact that the end 15 of the upper clamping member projects beyond the end 14 of the lower clamping member 11, the said end 15 will press against the cover or lid 20 of the vessel 19, when the clamp is applied, as shown most clearly in Fig. 6. The clamps 10 are connected together for relative adjustment by a tubular member 21 rigidly connected as at 22 to the upper clamping member 12 of one of the clamps, while the upper clamping member 12 of the other clamp has rigidly secured thereto as at 23 a rod member 24 slidable in the tubular member 21. The tubular member 21 and rod member 24 are of suitable length, and may be cross sectionally round, square or oval. The rod member 24 has notches 25 therein, each of which accommodates a suitable spring clip 26, which serves as a stop. This clip 26 may be readily changed from one notch to another for the purpose of limiting the movement of the clamps 10 toward each other beyond a set adjusted relationship. Each of the upper clamping members 12 has secured thereto a member 27 of angular construction. A tension spring 28 has one end thereof connected as at 29 with one end of one of the members 27, and the opposite end of the spring 28 has a hook 30 engageable in either one of a plurality of holes 31 in the other member 27. It will therefore be apparent that the tension of the spring 28 may be varied according to the relative adjustment of the clamps 10. It will therefore be understood that the holder may be adjusted to be serviceable in conjunction with cooking vessels or kettles and their covers or lids of different sizes.

To make adjustment of the holder for a cooking vessel and its cover of a particular size, the spring 28 is unhooked, and the clip 26 is set in the proper notch 25 in the rod member 24, so that the clamping ends 14 of the clamp will be spaced a distance slightly less than the diameter of the rim of the vessel. The hook 30 of the spring 28 is then engaged in the proper hole 31. The holder is then ready for use. With the cover 20 entirely over the top of the vessel 19, the holder may be put into use by gripping the clamps 10. The holder is placed directly over the top of the vessel and cover. The clamps 10 are pulled in opposite directions, so that the ends 14 of the lower clamping members will clear the rim 18. The ends 16 of the clamping members may then be squeezed causing separation of the ends 14 and 15, and when pressure on the ends 16 is released, the ends 14 and 15 will grip the rim 18 and cover 20. The spring 28 constantly acts to draw the clamps 10 toward each other, and supplements the action of the springs 13 to keep the holder in the applied position, to effectively hold the cover in place. When desired, the cover 20 may be slid or moved from its normal position to permit liquid to run out of the vessel 19 when it is canted. In this manner the liquid may be drained from the vessel 19, while the food will be prevented from being spilled, and this without liability of burning the hands. The holder may be detached in a manner which is obvious.

I claim:

1. A cover holder for cooking vessels comprising a pair of manipulatable spring clamps adapted to grip the rim of a vessel and its cover, means connecting the clamps together for relative adjustment, and tension means interposing said clamps and having a normal tendency to urge them toward each other.

2. A cover holder for cooking vessels comprising a pair of manipulatable spring clamps adapted to grip the rim of a vessel and its cover, means connecting the clamps together for relative adjustment, tension means interposing said clamps and having a normal tendency to urge them toward each other, and means to limit the movement of said clamps toward each other.

3. A cover holder for cooking vessels comprising a pair of clamps adapted to grip the rim of a vessel and its cover, means connecting the clamps together for relative adjustment, tension means interposing said clamps and having a normal tendency to urge them toward each other, and adjustable means limiting the movement of said clamps toward each other and also for varying the extent of movement of said clamps toward each other.

4. A cover holder for cooking vessels comprising a pair of manipulatable spring clamps adapted to grip the rim of a vessel and its cover, rigid members respectively rigidly connected with said clamps and associated with each other for relative sliding movement to connect said clamps together for relative adjustment, and tension means interposing said clamps and having a normal tendency to urge them toward each other.

5. A cover holder for cooking vessels comprising a pair of manipulatable spring clamps adapted to grip the rim of a vessel and its cover, rigid members respectively rigidly connected with said clamps and associated with each other for relative sliding movement to connect said clamps together for relative adjustment, tension means interposing said clamps and having a normal tendency to urge them toward each other, and coacting means on said rigid members to limit the movement of said clamps toward each other.

6. A cover holder for cooking vessels comprising a pair of clamps adapted to grip the rim of a vessel and its cover, means connecting the clamps together for relative adjustment, and tension means interposing said clamps and having a normal tendency to urge them toward each other, said tension means having provision for varying the tension thereof.

7. A holder comprising cooperable clamps connected together for relative sliding movement toward and away from each other, and tension means connected with said clamps and having a normal tendency to urge them toward each other, each of said clamps consisting of a pair of spring actuated members which cooperate to grip parts of an article to prevent unintentional separation thereof.

EBEN G. DOLAND.